July 24, 1962  W. N. CARD, SR  3,045,853
FORK-LIFT ATTACHMENT
Filed Jan. 27, 1961  4 Sheets-Sheet 1
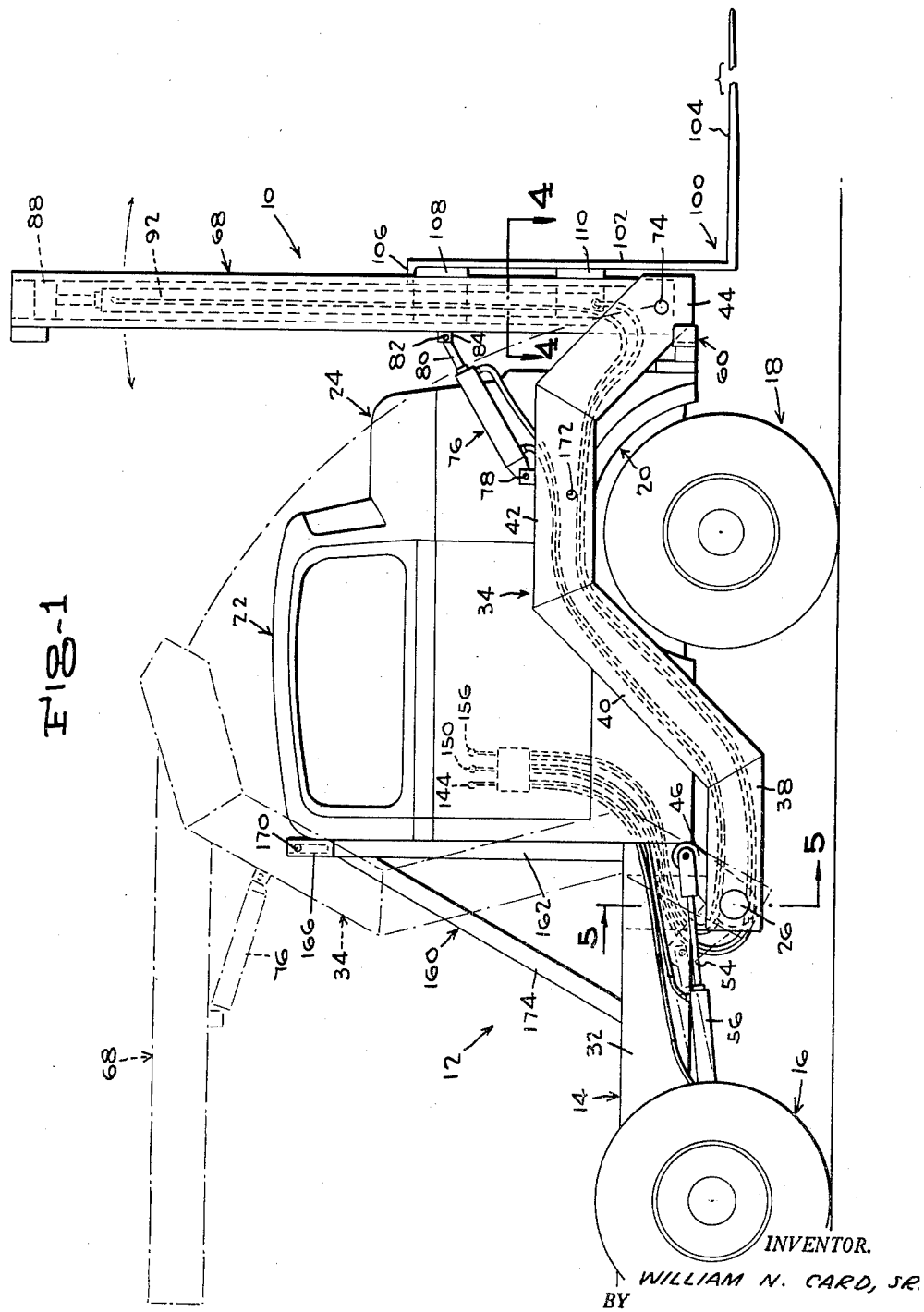
INVENTOR.
WILLIAM N. CARD, SR.
BY
McMorrow, Berman & Davidson
ATTORNEYS

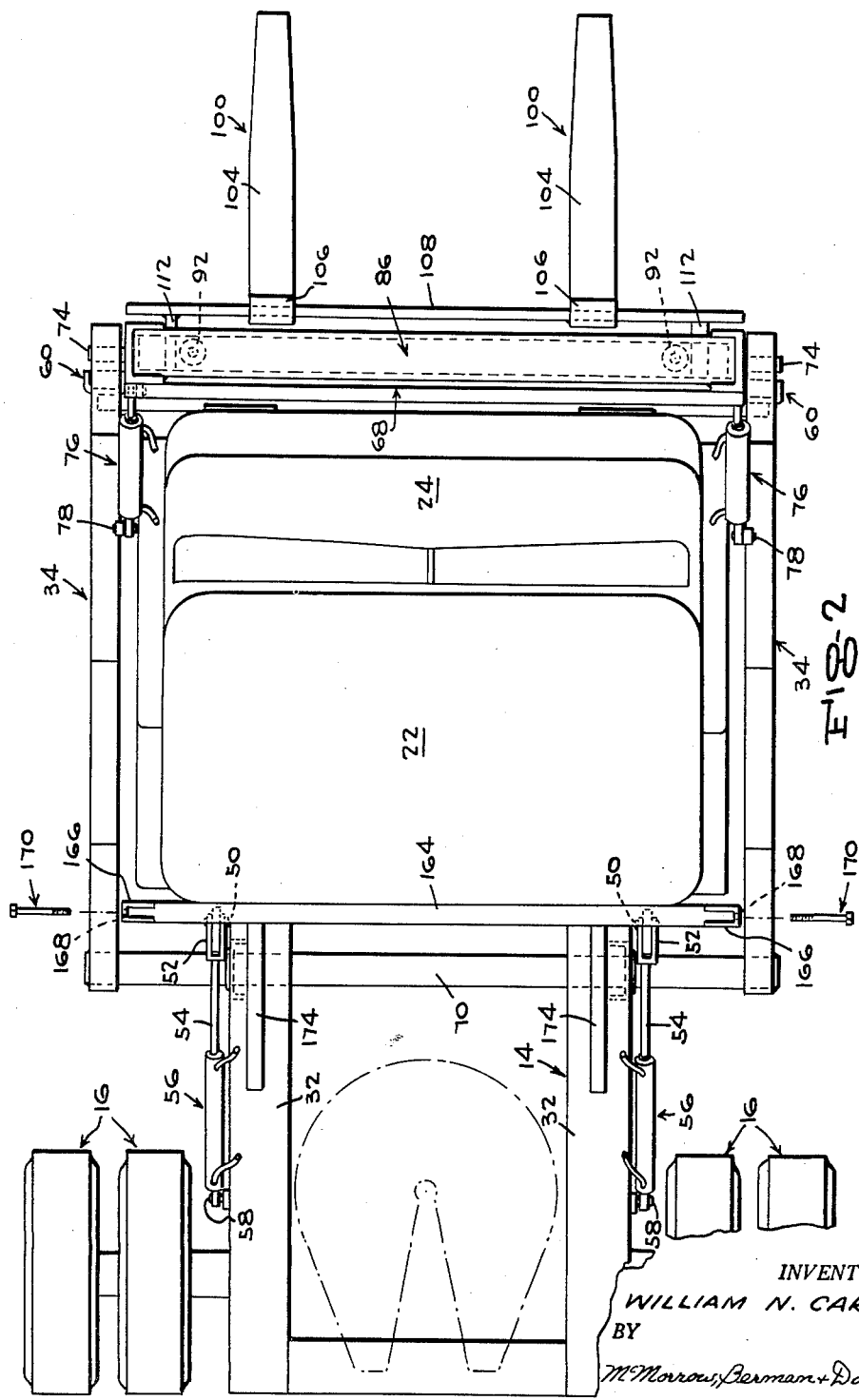

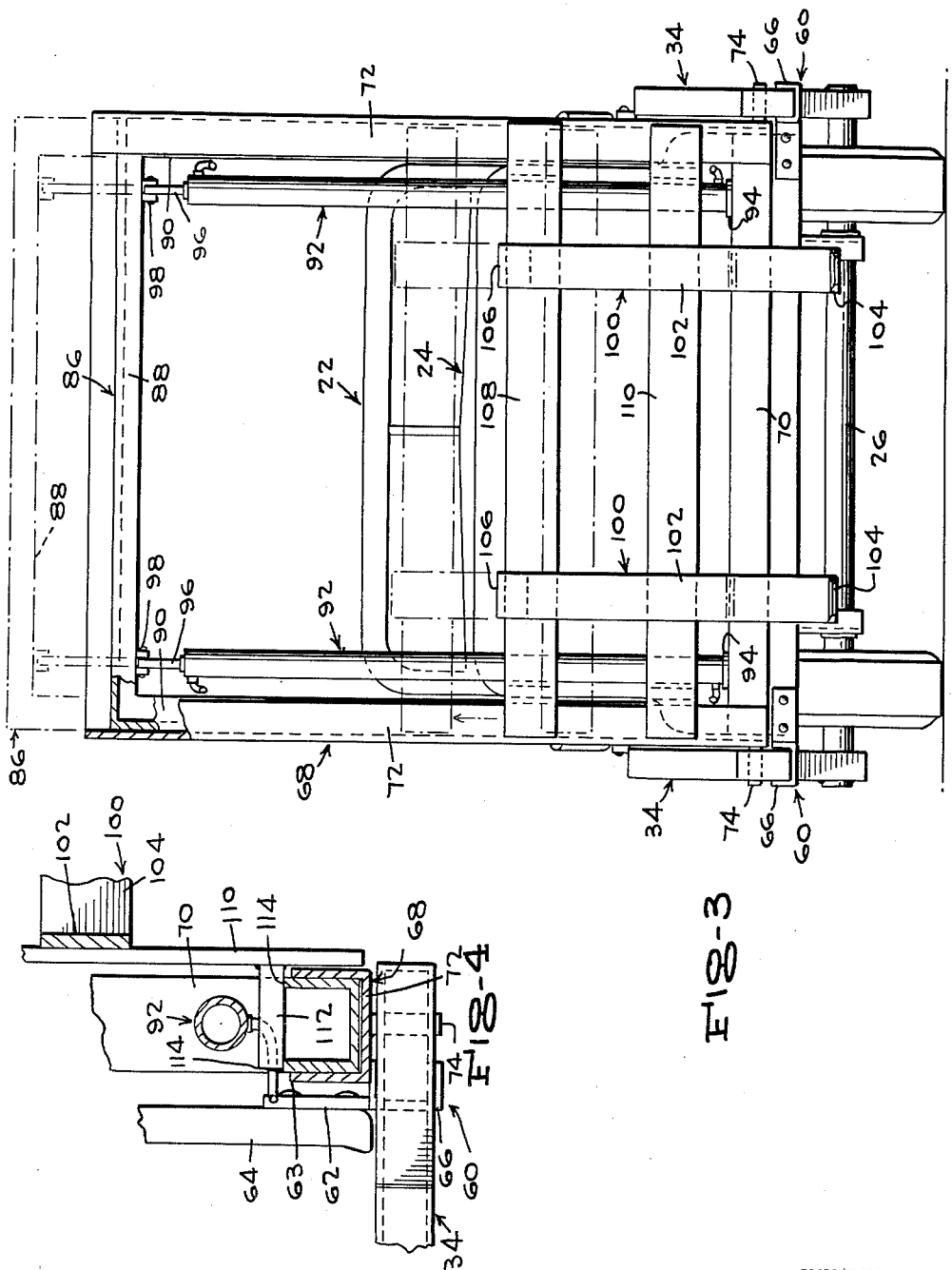

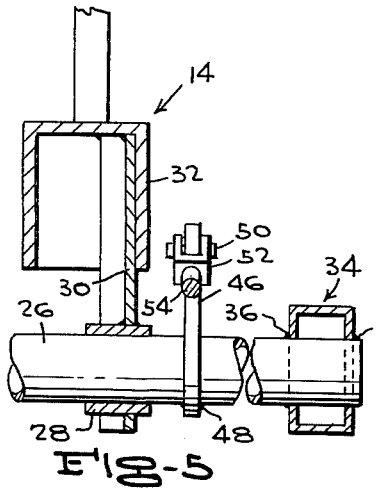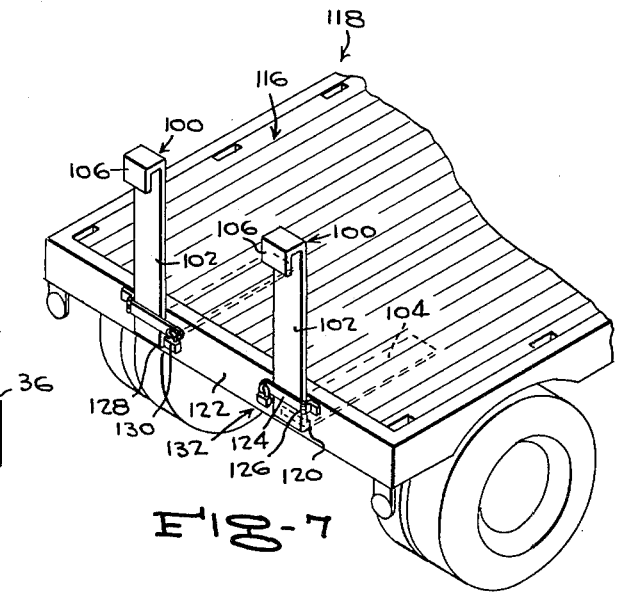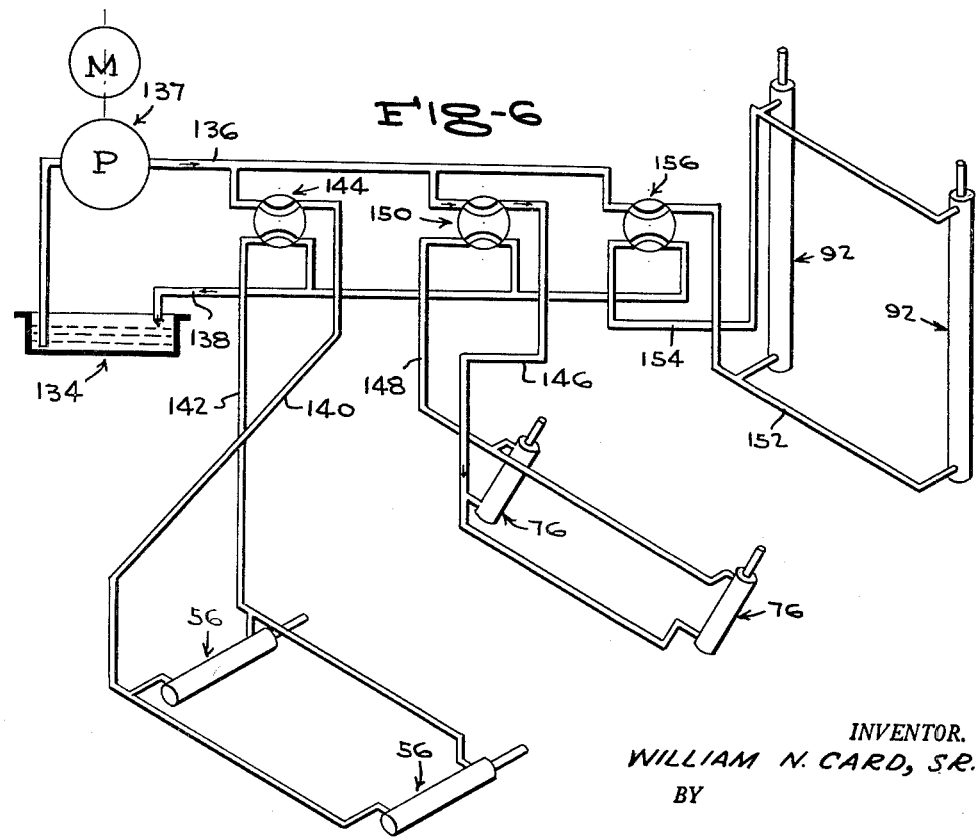

United States Patent Office 3,045,853
Patented July 24, 1962

3,045,853
FORK-LIFT ATTACHMENT
William N. Card, Sr., 2020 Vallecito Drive,
La Puente, Calif.
Filed Jan. 27, 1961, Ser. No. 85,234
2 Claims. (Cl. 214—672)

This invention relates to a novel front loading fork-lift attachment for trucks.

The primary object of the invention is the provision of a more efficient and capable hydraulically operated attachment of the wind indicated which can be more easily and economically installed, and which, when in a rearwardly retracted storage position, does not reduce the load-carrying capacity of the truck, and when in a forwardly extended operative position, does not obscure either the forward, sidewise, or rearward view of the operator of the truck, while seated in the cab of the truck.

Another object of the invention is the provision of an attachment of the character indicated above, which involves a swingable support which is adapted to surround the cab and engine hood of a truck, the support having longitudinal arms, disposed at opposite sides of the cab and hood, whose rear ends are pivoted to the truck chassis at the rear of the cab, and whose forward ends are positioned above the cab, in the storage position of the frame, and, in the extended use position of the frame, is in front of the hood and supported on bracket means fixed on the front of the truck chassis.

A further object of the invention is the provision of an attachment of the character indicated above, wherein the support involves a U-shaped lift frame which is pivoted, at its lower end, to the forward ends of the arms, and an inverted U-shaped fork-carrying slide engaged in the lift frame.

A still further object of the invention is the provision, in an attachment of the character indicated above, of forks which are removable from the slide and are storable when not in use, as in compartments provided therefor, in the rear end of the chassis of an associated trailer or semi-trailer.

Other important objects and advantageous features of the invention will be apparent from the following description and the accompanying drawings, wherein, for purposes of illustration only, a specific form of the invention is set forth in detail.

In the drawings:

FIGURE 1 is a right-hand side elevation of a tractor truck, having an attachment of the present invention installed thereon, the attachment being shown in use position in full lines, and in stored position in phantom lines;

FIGURE 2 is a top plan view of FIGURE 1;

FIGURE 3 is a front end elevation of FIGURE 1, portions being broken away and in section;

FIGURE 4 is an enlarged fragmentary horizontal section taken on the line 4—4 of FIGURE 1;

FIGURE 5 is an enlarged fragmentary vertical transverse section taken on the line 5—5 of FIGURE 1;

FIGURE 6 is a schematic diagram of the hydraulic system of the attachment, and;

FIGURE 7 is a fragmentary rear perspective view of a flat-bed trailer, showing storage of lift forks thereon, in accordance with the present invention.

Referring in detail to the drawings, wherein like numerals designate like parts throughout the several views, the illustrated attachment, generally designated 10, is shown installed on a tractor truck 12 with a horizontal chassis frame 14 having rear drive wheels 16, steerable front wheels 18, and fenders 20 over the front wheels. A driver's cab 22 is positioned at the forward end of the chassis frame 14 and includes a forwardly extending engine hood 24.

The attachment 10 comprises a horizontal transverse rotary axle 26 which is journalled, near its ends, as shown in FIGURE 5, in tubular bearings 28 on the lower ends of arms 30 which are fixed to and depend from related chassis frame side members 32, at locations near to and behind the rear end of the cab 22. Longitudinal arms 34, preferably rectangular tubular in form, are fixed, at their rear ends, on the axle 26, at locations spaced laterally outwardly from the side members 32 to locate the arms 34 in laterally outwardly spaced relation to the sides of the cab 22, as shown in FIGURES 2 and 3. As shown in FIGURE 5, the ends of the axle 26 preferably extend through the arms 34 and are welded thereto, as indicated at 36. As shown in FIGURE 1, the arms 34 have normally horizontal rear portions 38 which merge into the rear ends of kick-ups which include forwardly inclined rear portions 40, horizontal intermediate portions 42, and forwardly declining forward portions 44. The kick-ups provide clearance for turning the front truck wheels 18, when the legs 34 are in their depressed horizontal positions.

Upstanding radial lever arms 46 are fixed to the axle 26, as indicated at 48, in FIGURE 5, between the arms 34 and related chassis frame side members 32, and have pivoted to their outer ends, as indicated at 50, clevises 52 on the forward ends of the piston rods 54 of hydraulic elevating and depressing cylinders 56, which are pivoted, at their rear ends, as indicated at 58, to the outer sides of the side members 32. Extension of the piston rods 54 depresses the arms 34, from the vertical, rearwardly swung storage positions shown in phantom lines in FIGURE 1, to depressed horizontal use positions shown in full lines in FIGURE 1, wherein the lower ends of the forward portions 44 of the arms rest on brackets 60. The brackets 60 have portions 62 fixed, as indicated at 63, to the forward side of a front cross member 64 of the truck chassis frame, and forwardly extending channel portions 66, in which the arms 34 seat. The arms 34 are adapted to be swung upwardly and rearwardly to storage position, by retraction of the piston rods 54.

A U-shaped lift frame 68 is positioned between and pivoted to the forward ends of the arms 34. The lift frame 68 comprises a horizontal bight portion 70 having upstanding and facing channel legs 72, which are open at their upper ends. In line with the bight portion 70, the lift frame has lateral pivots 74 which are journalled through the forward portions 44 of the arms 34. Forwardly inclined hydraulic lift frame tilting cylinders 76 are pivoted at thir rear ends, as indicated at 78, to the top of the intermediate portions of the arms 34 and have piston rods 80 which are pivoted, as indicated at 82, to ears 84 on the rear sides of the lift frame legs 72. Retraction of the piston rods 20 tilt the lift frame 68 rearwardly toward the arms 34, which extension of the piston rods 80 tilts the frame 68 away from the arms 34. In its use position, the lift frame 68 is in a perpendicular position, as shown in FIGURE 1.

An inverted U-shaped slide 86 has a horizontal bight portion 88 and depending channel legs 90, which, as shown in FIGURE 4, are slidably confined within the channel legs 72 of the lift frame 68. A pair of laterally spaced vertical hydraulic lift cylinders 92, positioned near the slide legs 90, are fixed, at their lower ends, as indicated at 94, upon the bight portion 70 of the lift frame 68, and have upwardly extending piston rods 96 which are pivoted at their upper ends, as indicated at 98, to the underside of the bight portion 88 of the slide 86. Extension of the piston rods 96 moves the slide 86 upwardly relative to the lift frame 68 and retraction thereof depresses the slide in the lift frame.

A pair of laterally spaced L-shaped lift forks, each generally designated 100, comprises vertical standard portions 102 and horizontal foot portions 104, positioned at right angles to the standard portions. Hoods 106 formed on the upper ends of the standard portions 102 are positioned on the sides of the standard portions remote from the foot portions 104. The lift forks 100 are removably mounted on the slide 86, and, for the purpose, vertically spaced upper and lower transverse horizontal narrow plates 108 and 110 extend across and are spaced forwardly from the slide 86, at locations below the mid-height of the slide 86. As shown in FIGURE 4, the plates 108 and 110 are fixed to rearwardly extending plates 112 which are fixed, as indicated at 114, to the free edges of the channel legs 90 of the slide 86. The lift fork hooks 106 are engaged freely over the upper plate 108, and the standard portions 102 bear against the forward surface of the lower plate 110.

As shown in FIGURE 7, when the lift forks 100 are removed from the slide 86, preparatory to moving the attachment to the storage position, from use position, the lift forks are adapted to be stored, in handy and easily assembled position, on the rear end of the bed 116 of a flat-bed trailer 118, associated with the truck 12. To this end, the bed 116 is formed with laterally spaced horizontal longitudinal slots 120 which open to its rear end 122, into which the foot portions 104 are inserted, with the standard portions 102 extending upwardly so as to be available to serve as stops for cargo on the bed 116. The lift forks are retained in the slots 120, by suitable means, such as straps 124 which extend across the standard portions 102, above the slots 120, and are hinged, as indicated at 126, at one end to the bed end 122 and, at their other ends, are engaged over eyes 128 fixed to the bed and, through which the yokes 130 of padlocks 132 are engaged.

A suitable hydraulic system for operating the attachment 10, shown in FIGURE 6, comprises a fluid reservoir 134, a pressure pipe 136, in which a suitably driven pump 137 is incorporated, and a return pipe 138, entering the reservoir, branches leading therefrom to the various hydraulic cylinders, and control valves associated therewith.

For the elevating and depressing cylinders 56 which operate the arms 34, the pipes 136 and 138 have branches 140 and 142, respectively, which lead to opposite ends of the cylinders 56, and which severally open to and share a rotary control valve 144 whereby its cylinders 56 are operated independently of the other hydraulic cylinders. The lift frame tilting cylinders 76 have branches 146 and 148 severally leading from the pipe 136 and 138, with which is associated a rotary control valve 150, and branches 152 and 154 severally lead from the pipes 136 and 138, and have a rotary control valve 156 associated therewith. The valves are preferably mounted within the driver's cab 22.

In operation, the valve 144 is operated to move the arms 34 between their depressed use positions to their elevated storage positions. The valve 150 is operated to move the lift frame 68 to perpendicular use position, relative to the arms 64, as shown in full lines in FIGURE 1 and to move the lift frame 68 downwardly toward the arms 34, to a horizontal position, as shown in phantom lines in FIGURE 1, and, in the case where the truck 12 is on slanting ground, to position the lift frame perpendicular relative to the actual horizontal.

The attachment 10 is locked in retracted storage position on a support 160 comprising channel uprights 162 which are fixed, at their lower ends to the chassis frame side members 32, and a cross member 164 is fixed on the upper ends of the uprights 162 and extends laterally therebeyond and has upright channels 166 on its outer ends, whose webs are provided with bolt holes 168. Removable bolts 170 extend through the holes 168 and thread into threaded holes 172, provided in the intermediate portions 42 of the arms 34. Diagonal brace bars 174 extend between the uprights 162 and the chassis frame side members 32.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a horizontal truck chassis having an end and side members, longitudinal lift arms extending along said side members, said arms normally being horizontal with one end thereof at the forward end of the chassis, means mounting the other ends of the arms on the chassis, a U-shaped lift frame positioned between said one end of the lift arms and pivoted thereon, adjustable means extending between and connected to the arms and the lift frame, said lift frame having a cross member and upstanding legs, an inverted U-shaped slide frame located between the legs of the lift frame, said slide frame having a cross member and downwardly extending legs, the legs of the slide frame being slidably confined on the legs of the lift frame for vertical movement relative thereto, vertical hydraulic lift cylinder means extending between and connected to the cross members of the lift and slide frames, and lift fork means rigidly mounted on the slide frame, pivot means mounting the said other ends of the lift arms on the chassis, and hydraulic cylinder means connected to the chassis and to the lift arms for elevating and depressing the lift arms, upstanding rest means on the chassis adjacent to said pivot means upon which the arms are adapted to rest in an over-center elevated storage position of the lift arms.

2. In combination, a horizontal truck chassis having an end and side members, longitudinal lift arms extending along said side members, said arms normally being horizontal with one end thereof at the forward end of the chassis, means mounting the other ends of the arms on the chassis, a U-shaped lift frame positioned between said one end of the lift arms and pivoted thereon, adjustable means extending between and connected to the arms and the lift frame, said lift frame having a cross member and upstanding legs, an inverted U-shaped slide frame located between the legs of the lift frame, said slide frame having a cross member and downwardly extending legs, the legs of the slide frame being slidably confined on the legs of the lift frame for vertical movement relative thereto, vertical hydraulic lift cylinder means extending between and connected to the cross members of the lift and slide frames, and lift fork means rigidly mounted on the slide frame, pivot means mounting the said other ends of the lift arms on the chassis, and hydraulic cylinder means connected to the chassis and to the lift arms for elevating and depressing the lift arms, upstanding rest means on the chassis adjacent to said pivot means upon which the arms are adapted to rest in an over-center elevated storage position of the lift arms, a cross member fixed on and extending across the said side of the chassis having upwardly opening channels in which the lift arms rest in the depressed operative position of the lift arms.

References Cited in the file of this patent

UNITED STATES PATENTS

| | | |
|---|---|---|
| 2,754,020 | Dunn et al. | July 10, 1956 |
| 2,867,341 | Tieslav | Jan. 6, 1959 |
| 2,910,203 | Todd | Oct. 27, 1959 |
| 2,965,254 | Bowles | Dec. 20, 1960 |